July 25, 1972  A. E. GODBEHERE  3,679,558
ELECTROLYTIC MARKING OF METAL OBJECTS
Filed Aug. 6, 1970  3 Sheets-Sheet 1
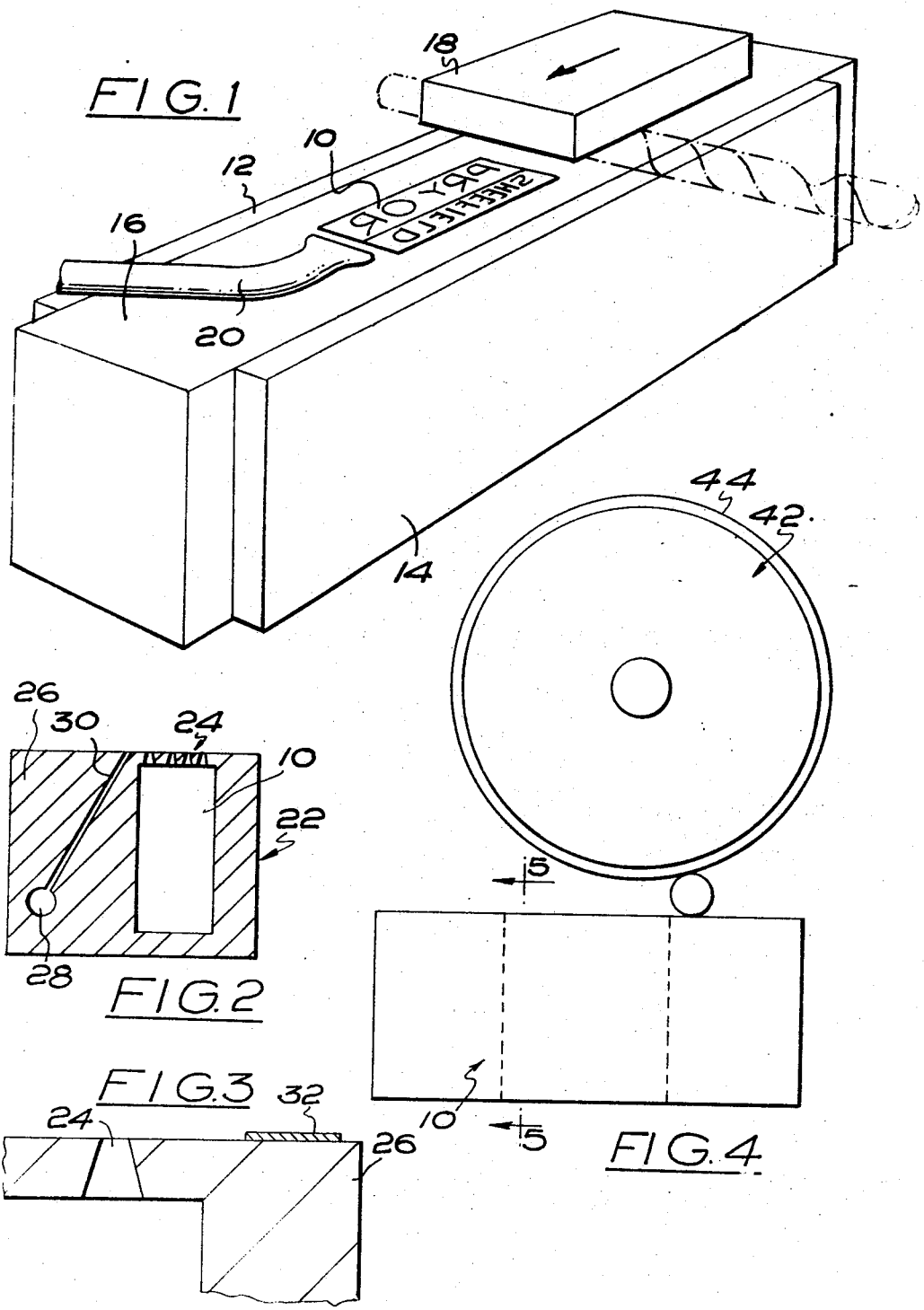
INVENTOR
ALBERT EDWARD GODBEHERE
BY Jacobs & Jacobs July 25, 1972   A. E. GODBEHERE   3,679,558
ELECTROLYTIC MARKING OF METAL OBJECTS
Filed Aug. 6, 1970   3 Sheets-Sheet 2

INVENTOR
ALBERT EDWARD GODBEHERE
BY
Jacobs & Jacobs

July 25, 1972  A. E. GODBEHERE  3,679,558
ELECTROLYTIC MARKING OF METAL OBJECTS
Filed Aug. 6, 1970  3 Sheets-Sheet 3
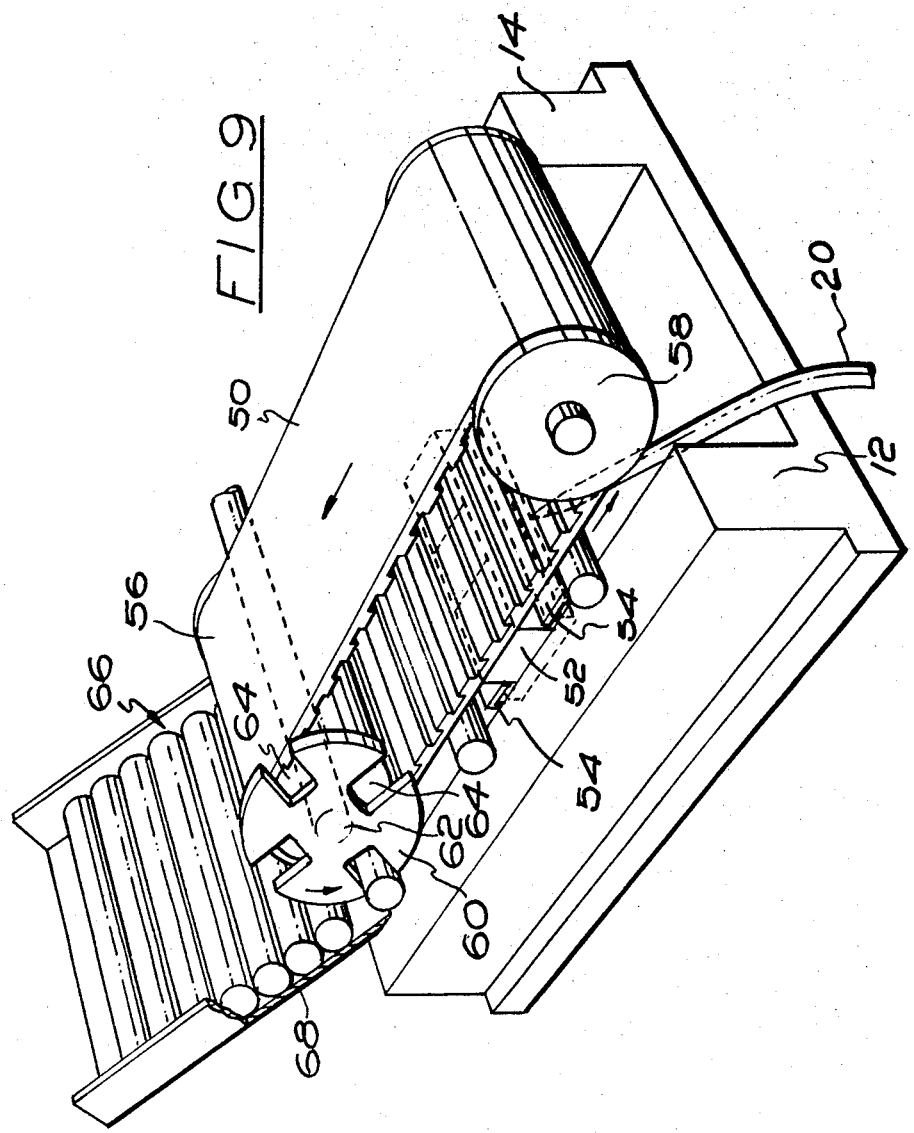
INVENTOR
ALBERT EDWARD GODBEHERE
BY Jacobs & Jacobs United States Patent Office 3,679,558
Patented July 25, 1972

3,679,558
ELECTROLYTIC MARKING OF METAL OBJECTS
Albert Edward Godbehere, Sheffield, England, assignor to Edward Pryor Developments Limited
Filed Aug. 6, 1970, Ser. No. 61,640
Int. Cl. B23p 1/00
U.S. Cl. 204—143 R         14 Claims

ABSTRACT OF THE DISCLOSURE

A method of and apparatus for electrolytically marking metal objects of circular shape by flooding the surface to be marked with a deluge of electrolyte and bringing an electrode member into close proximity with said surface, the electrode member bearing in relief the markings with which it is required to mark said surface, the electrode and the object to be marked being connected into an electric circuit suitable to cause an electrolytic action to occur between the two and the electrode member being brought into close proximity with the surface of the object to be marked with a rolling action.

---

Figure 5:
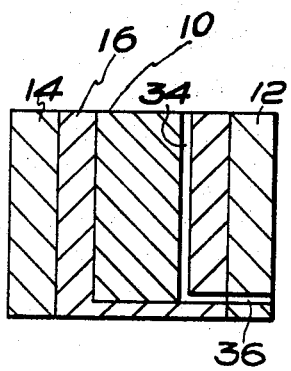

The invention relates to the electrolytic marking of metal objects and has for its object to provide an improvement therein.

In particular, the main object of the invention is to provide a method of and apparatus for electrolytically marking metal objects of circular shape with a mark of superior quality and of a consistent quality around the periphery of the object.

According to one aspect of the invention, there is provided a method of electrolytically marking metal objects of circular shape, the method comprising the steps of flooding the surface to be marked with a deluge of electrolyte and bringing a metallic electrode member into close proximity with said surface, the electrode member bearing in relief the markings with which it is required to mark said surface, the electrode and the object to be marked being connected into an electric circuit suitable to cause an electrolytic action to occur between the two, the electrode member being brought into close proximity with the surface of the object to be marked with a rolling action. Preferably, the rolling action between the electrode member and the object to be marked is effected by rolling the latter across a surface of the electrode member which bears the figures or other markings with which it is required to mark the object. Preferably, also, the object to be marked rolls in contact with at least one metal plate as it rolls across the surface of the electrode member, said metal plate being fixed relative to the electrode member but being electrically insulated therefrom and serving to complete the electric circuit through the object to be marked. Alternatively, the object to be marked may be rolled across the surface of the electrode member by a pressure pad which serves to complete the electric circuit through the object to be marked. The surface to be marked is preferably flooded with the electrolyte by means of a jet or a series of jets extending through the electrolyte assembly and so positioned that electrolyte is ducted onto the surface to be marked.

According to a further aspect of the invention, apparatus for carrying out the method comprises means for flooding the surface of the object to be marked with a deluge of electrolyte and means for bringing a metallic electrode member into close proximity with said surface with a rolling action, the electrode member bearing in relief the marking with which it is required to mark said surface, and the electrode and the object to be marked being capable of being connected into an electric circuit suitable to cause an electrolytic action to occur between the two.

The apparatus preferably includes means for rolling the object to be marked across the surface of the electrode member which bears the markings with which it is required to mark the object. Preferably, also, it will include at least one metal plate in contact with which the object to be marked can roll as it rolls across the surface of the electrode member, said metal plate being fixed relative to the electrode member but being electrically insulated therefrom and capable of completing the electric circuit through the object to be marked. Alternatively, it may include a pressure pad for rolling the object to be marked across the surface of the electrode member, the pressure pad serving also to complete the electric circuit through the object to be marked. The electrode member may form part of an electrode assembly through which at least one duct extends for the flow of electrolyte to the face of the electrode member. In fact, the electrode member of the electrode assembly may be contained within an outer covering of an insulating material (e.g. an epoxy resin), the at least one duct for the flow of electrolyte to the face of the electrode member being formed in said material.

According to a still further aspect of the invention, there is provided an object of circular shape bearing on its periphery a mark which has been applied thereto by the method or apparatus described above.

In order that the invention may be fully understood and readily carried into effect, a preferred embodiment thereof will now be described, by way of example only, with reference to the accompanying drawings, of which:

FIG. 1 is a perspective view of apparatus for carrying out the inventive method, FIG. 2 is a sectional view of an electrode assembly, and FIG. 3 is an enlarged sectional view through the face of the electrode assembly shown in FIG. 2.

Figure 6:
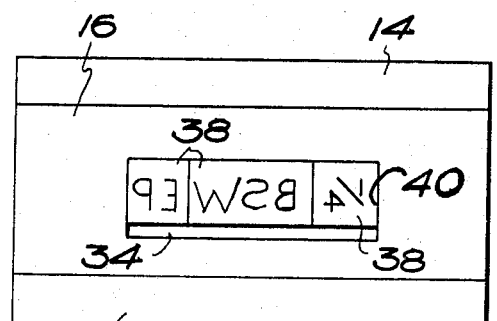
Figures 7, 8:
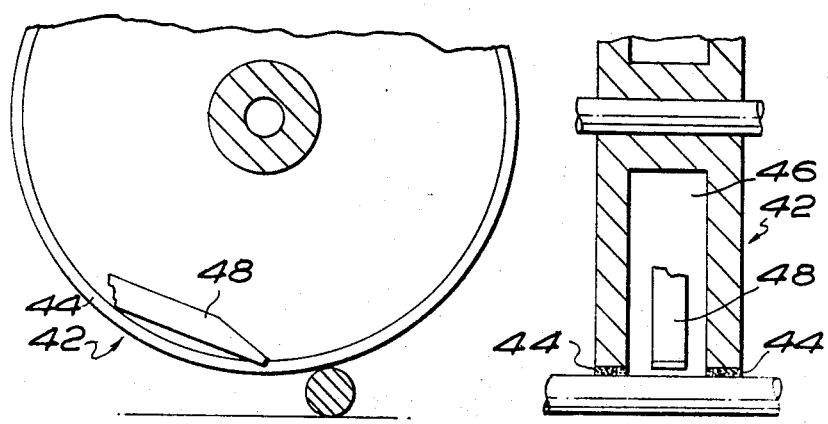

FIG. 4 is a side view of an alternative form of apparatus for carrying out the inventive method, FIG. 5 is a sectional view on the line 5—5 in FIG. 4, FIG. 6 is a plan view of the electrode member shown in FIG. 5, FIG. 7 is a side view of another form of apparatus for carrying out the inventive method, and FIG. 8 is a sectional view on the line 8—8 in FIG. 7, and FIG. 9 is a perspective view of a still further form of apparatus for carrying out the inventive method.

Referring now to FIG. 1 of the drawings, there is illustrated apparatus for marking a cylindrical metal component (in this case a twist drill shown in chain-dotted lines) by an electrolytic process. The apparatus includes a metallic electrode member 10 which bears in relief the letters, figures or other markings with which it is required to mark the cylindrical surface of the component. A pair of stainless steel plates 12 and 14 flank the electrode member but are electrically insulated therefrom by insulating material 16. Said plates and the electrode member are connected into an electric circuit so that the plates have positive potential and the electrode member has negative potential. The upper edges of the plates stand proud of the top surface of the electrode member by approximately two thousandths of an inch.

The apparatus also includes a pressure pad 18 made of a non-conductive material and capable of being traversed as indicated by the arrow, to roll the object to be marked across the surface of the electrode member whilst the object bears upon the upper edges of the plates. A feed pipe 20 is provided for flooding the surface of the object with a deluge of electrolyte whilst it is being rolled in this way across the surface of the electrode. Thus it will be seen that as the object is rolled across the surface of the electrode member, an electrolytic action will take place to mark the cylindrical surface of the object with the markings of the electrode. It has been found that when an object of circular shape has been marked by the method or by the apparatus hereinbefore described the resulting mark has been of superior quality and has consistently been of uniform quality around the periphery of the object. This has previously been very difficult to achieve consistently.

During the time in which the electrolytic action takes place, which can be varied by varying the rate of traverse of the pressure pad according to the depth of mark required, the current flowing may be in the region of 150 amps per square inch. By varying the applied voltage between 0 and 20 volts the current may be controlled to produce the quality of mark and depth of mark desired.

Various modifications may, of course, be made without departing from the scope of the invention. For example, the pressure pad need not necessarily be made of a non-conductive material, but of course if it is made of metal it must be electrically insulated from the remainder of the machine if the electric circuit is to be completed through the steel plates 12 and 14 which flank the electrode member. It will also be understood that the required traverse of the pressure pad can be brought about in numerous ways. It could, for example, be driven by means of a variable speed electric motor and connecting rod drive. Alternatively, of course, instead of the electrode member being fixed and the object to be marked being rolled across it, the object to be marked could be mounted for rotation about a fixed axis and the electrode member traversed in contact with it. In either cases, the steel plates flanking the electrode member could be omitted and the electric circuit could be completed through an electrically conductive pressure pad or a chuck or the like in the which the object to be marked is held as the case may be. Other means will then be employed for assuring that the surface of the object to be marked is spaced by the required distance from the surface of the electrode member during the marking process.

Referring now to FIGS. 2 and 3, in a further modification the feed pipe 20 is omitted and the metallic electrode member 10 forms part of an electrode assembly generally indicated 22. The electrode member bears in relief at its face (that is to say on its top side) the letters, figures or other markings 24 with which it is required to mark the surface of a workpiece. Said electrode member is encased in a block 26 of epoxy resin insulating material into which extends a main flow passage 28 for an electrolyte. A plurality of flow passages 30 extend between said main flow passage and the face of the electrode member so that the electrolyte can be directed as a plurality of jets just where it is required.

The insulating material may have been cast in a mould around the electrode member whilst the latter has rested upon the markings 24 placed in the base of the mould. In the finished electrode assembly, therefore, the face of the electrode assembly lies flush with the exposed ends of the markings. It may be convenient, therefore, to hold the surface to be marked clear of the face of the electrode member by strips of adhesive tape 32 approximately two thousandths of an inch thick stuck to the insulating material at points flanking the markings. Alternatively, of course, the electrode assembly could be clamped between a pair of steel plates for the apparatus to operate as previously described with reference to FIG. 1.

Referring now to FIGS. 4 to 6 of the drawings, in an alternative apparatus the metallic electrode member 10 is set in a block of synthetic plastics insulating material 16, a deep longitudinal slot 34 being formed along one side of the electrode member, as shown, for the supply of a deluge of electrolyte to the face of said electrode member. A cross port 36 communicates with said slot and its outer end is screwthreaded for the connection of a supply pipe (not shown). As shown in FIG. 6, the electrode member may be built up by a plurality of separate metallic elements 38 set in a wide slot 40 in the block 16 so that the narrow slot 34 is formed by the difference between the widths of said elements and the width of said wide slot.

As in the previously described embodiment, a pair of stainless steel plates 12 and 14 flank the electrode member (but are insulated therefrom by the insulating material 16 in which the electrode member is set), and the electrode member and steel plates are again connected into an electric circuit so that the plates have positive potential and the electrode member has negative potential. The object to be marked can again be rolled across the surface of the electrode member, its surface being spaced from that of the electrode member by the fact that the steel plates stand proud of the top surface of the electrode member by approximately two thousandths of an inch. In this case, however, the pressure pad for rolling the object to be marked across the surface of the electrode member is constituted by a resilient peripheral portion 44 of a wheel 42. When an object to be marked is advanced into the "nip" between the wheel and the electrode member, a jamming action results which causes the object to be rolled across the electrode member and out the other side, the object being pressed into the resilient peripheral portion of the wheel to some extent as it passes beneath the wheel.

Referring now to FIGS. 7 and 8, in a modification of the apparatus just described, the wheel 42 has a deep groove 46 around its periphery and intermediate its width. A feed pipe 48 extends into said groove from one side of the wheel so that the surface of the electrode member can be flooded with a deluge of electrolyte. In this case, therefore, electrolyte is not fed through the electrode assembly.

Referring now to FIG. 9, a still further form of apparatus for carrying out the inventive method includes an endless belt 50 with a resilient outer surface for rolling the objects to be marked across the surface of the electrode member. The electrode member in this case is constituted by a pair of metallic elements 52 which bear in relief the markings with which it is required to mark the cylindrical surfaces of the objects to be marked. The elements 52 are of inverted T-shape as shown and are secured in position by clamps 54. As in the embodiment previously described with reference to FIG. 1, the electrode member is flanked by a pair of stainless steel plates 12 and 14 but is electrically insulated therefrom. The feed pipe 20 extends upwards between said plates to direct a flow of electrolyte towards the electrode member. The plates and the electrode member are again connected into an electric circuit so that the plates have positive potential and the electrode member has negative potential. The upper edges of the plates stand proud of the top surface of the electrode member by approximately two thousandth of an inch so that as an object to be marked is rolled across the surface of the electrode member and electrolytic action takes place. The belt 50 encircles respective driven and idler pulleys 56 and 58 and has slot and lobe engagement with said driven pulley as shown so that slip cannot take place. Workpiece feed mechanism is associated with the driven pulley and is constituted by a disc 60 secured on the drive shaft 62 on which the driven pulley is mounted. The disc is provided with four equally spaced slots 64 which extend radially inwards from its periphery as shown and the arrangement is such that a stack of workpieces 66 in a feed chute 68 rests against the periphery of the disc 60 until a slot 64 comes into a position to receive the lowermost workpiece.

During the operation of the apparatus the workpieces, that is to say the objects to be marked, are fed in turn into the gap between the stainless steel plates and the lowermost run of the belt which of course serves as a pressure pad holding the objects in engagement with the plates. The objects to be marked are thus rolled across the surface of the electrode member in turn and in close succession. The output of the apparatus is of course dependent upon the speed at which the driven pulley 56 and disc 60 are driven, assuming that the feed chute 68 is kept charged with a supply of the objects to be marked. It has been found that a consistently high output can be maintained by this apparatus. However, it will be realised that the workpiece feed mechanism in particular may be modified in various ways with a view to improving still further the throughput of the apparatus.

Various other modification could of course be made without departing from the scope of the invention and although the electrode member has in each of the embodiments described been illustrated as being an upwardly facing member, either fixed or traversable, it will be understood that it could alternatively be a downwardly facing member, again either fixed or traversable according to the way in which the apparatus is to operate.

What I claim and desire to secure by Letters Patent is:

1. A method of electrolytically marking metal objects of circular shape, comprising the steps of rolling the circular object to be marked across a surface of an electrode member which bears in relief markings with which it is required to mark the object, simultaneously flooding the surface of the object to be marked with a deluge of electrolyte, and maintaining a necessary spacing between the surface of the object to be marked and the markings which the electrode member bears as the object rolls across the surface of the electrode member, the electrode member and the object to be marked being connected into an electric circuit suitable to cause an electrolytic action to occur between the two.

2. The method according to claim 1, in which the object to be marked is rolled across the surface of the electrode member by a pressure pad which serves to complete the electric circuit through the object to be marked.

3. The method according to claim 1, in which the object to be marked is rolled across the surface of the electrode member by a pressure pad which plays no part in completing an electric circuit through the object to be marked.

4. The method according to claim 3, in which the pressure pad is constituted by a resilient peripheral portion of a wheel.

5. The method according to claim 3, in which the pressure pad is constituted by a run of an endless belt encircling driven and idler pulleys.

6. Apparatus for electrolytically marking metal objects of circular shape, comprising an electrode member which bears in relief markings with which it is required to mark the object, means for rolling the circular object to be marked across the surface of said electrode member, means for flooding the surface of the object to be marked with a deluge of electrolyte, means for maintaining a necessary spacing between the surface of the object to be marked and the markings which the electrode member bears as the object rolls across the surface of the electrode member and means for connecting the electrode member and the object to be marked into an electric circuit suitable to cause an electrolytic action to occur between the two.

7. Apparatus according to claim 6, including at least one metal plate in contact with which the object to be marked can roll as it rolls across the surface of the electrode member said metal plate being fixed relative to the electrode member but being electrically insulated therefrom and capable of completing the electric circuit through the object to be marked.

8. Apparatus according to claim 6, wherein the means for rolling the object to be marked across the surface of the electrode member are capable of completing the electric circuit through the object to be marked and wherein a pair of metal plates flank the electrode member but are electrically insulated therefrom, upper edges of said plates standing proud of the top surface of the electrode member by the distance which the surface to be marked should be spaced from the surface of the electrode member during an electrolytic marking process.

9. Apparatus according to claim 7, wherein said rolling means includes a pressure pad for rolling the object to be marked across the surface of the electrode member, said pressure pad playing no part in the completion of an electric circuit through the object to be marked.

10. Apparatus according to claim 6, including means for varying the rate at which the object to be marked can be rolled across the surface of the electrode member, whereby the quality and depth of mark desired can be produced.

11. Apparatus according to claim 6, including means for varying the applied voltage in the electric circuit, whereby the quality and depth of mark desired can be produced.

12. Apparatus according to claim 6, wherein said rolling means includes a wheel with a resilient peripheral portion for rolling the object to be marked across the surface of the electrode member.

13. Apparatus according to claim 6, wherein said rolling means includes an endless belt for rolling the object to be marked across the surface of the electrode member.

14. Apparatus according to claim 6, wherein the electrode member forms part of an electrode assembly through which at least one duct extends for the flow of electrolyte to the face of the electrode member.

References Cited

UNITED STATES PATENTS 3,562,132   2/1971   Godbehere _____ 204—224
3,532,616   10/1970  Garnett _____ 204—224

JOHN H. MACK, Primary Examiner

N. A. KAPLAN, Assistant Examiner

U.S. Cl. X.R.

204—143 M, 224